United States Patent [19]

Johnson et al.

[11] Patent Number: 6,047,297
[45] Date of Patent: Apr. 4, 2000

[54] METHOD AND SYSTEM FOR EDITING ACTUAL WORK RECORDS

[75] Inventors: Eric W. Johnson, Redmond; Alan Aitken Ramaley, Seattle, both of Wash.

[73] Assignee: Microsoft Corporation, Redmond, Wash.

[21] Appl. No.: 08/781,293

[22] Filed: Jan. 13, 1997

[51] Int. Cl.[7] .............................. G06K 9/54; G06F 17/30
[52] U.S. Cl. ........................................... 707/530; 707/503
[58] Field of Search ..................................... 707/530, 504, 707/511, 503, 500, 526, 101, 52, 505–508, 3, 102, 531, 538, 540, 515, 517

[56] References Cited

U.S. PATENT DOCUMENTS 5,381,332  1/1995  Wood ....................................... 364/401

OTHER PUBLICATIONS

Tim Pyron, "Using Microsoft Project 4 for Windows, Que Corporation", pp. 271–281, Jan. 1994.

*Primary Examiner*—Joseph H. Feild
*Assistant Examiner*—Alford W. Kindred
*Attorney, Agent, or Firm*—Jones & Askew, LLP

[57]  ABSTRACT

A method and system for editing actual work records with a start date, an end date and a work value. A period actual is entered, including a period actual start date, period actual end date, and a period actual work value. Before the period actual is stored as an actual work record, it is determined whether there is any overlap between the actual work records and the period actual. If so, any overlap between the actual work records and period actual is eliminated. Any overlapping actual work records that are completely within the period actual, i.e., with a start date and end date between the period actual start date and period actual end date, are deleted. For an overlapping actual work record that surrounds the period actual, i.e., the period actual start date and period actual end date are between the start date and end date, the end date and work value of the overlapping actual work record are modified and a new actual work record is created. For an overlapping period actual with a start date before the period actual end date and an end date equal to or between the period actual start date and period actual end date, the end date and work value are modified. For an overlapping period actual with a start date equal to or between the period actual start date and period actual end date and an end date after the period actual end date, the start date and work value are modified.

18 Claims, 10 Drawing Sheets

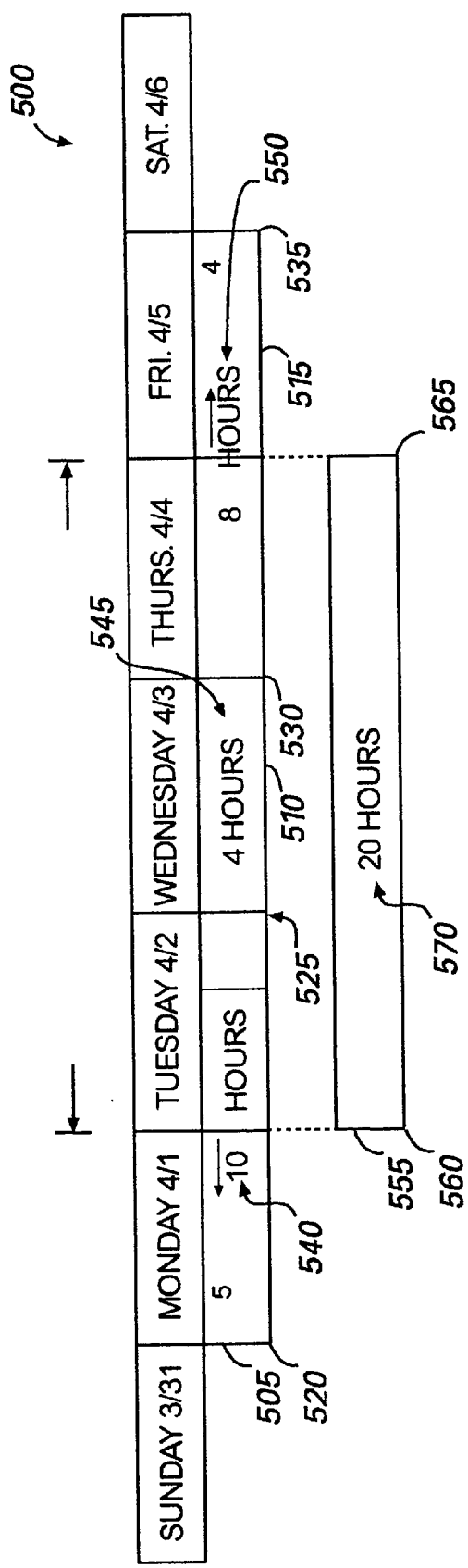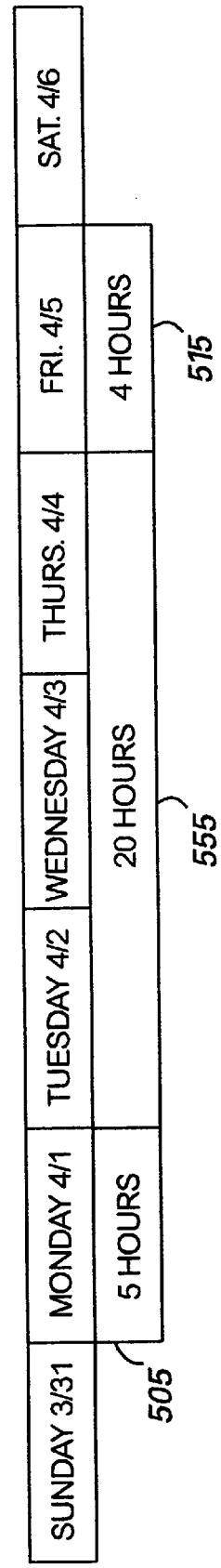
FIG.5A
FIG.5B

METHOD AND SYSTEM FOR EDITING ACTUAL WORK RECORDS

TECHNICAL FIELD

This invention relates to a system and method for editing actual work records in a project management program module. More particularly, this invention relates to a method and system for editing actual work at a different granularity than the actual work was first entered.

BACKGROUND OF THE INVENTION

Part of a project manager's job typically is to track and report the progress made in completing specific tasks. Many project managers track the progress each individual employee has made in accomplishing an assignment. Thus, project management software has been developed to allow a user to track the amount of time a particular individual has worked on a specific assignment and how much more working time is needed to complete the assignment.

Project management software generally allows a user to enter and manipulate tasks, resources, and assignments. A task is a project that needs to be completed. Resources are typically the individuals who complete the tasks. Assignments are the links between tasks and resources. In other words, an assignment is the allocation of a particular resource to a particular task. Several resources may be assigned to complete a task. Thus, there may be several assignments needed to complete one task.

A project manager often wants to track the amount of work that has been completed on assignments and the amount of work that remains to be completed. The amount of work that has been completed is known as actual work and the amount of work that is yet to be completed is known as remaining work.

Project management software typically allows a user to enter the actual work performed by an individual on a particular assignment. A user can view the actual work performed at a different granularity than the granularity at which the actual work was entered. For instance, Bob is assigned to task A. Bob enters his actual work on a daily basis using project management software. However, Bob's manager views Bob's actual work on a monthly or quarterly basis rather than a daily basis. Most project management software allows Bob's manager to view Bob's total actual work at different granularities. However, present project management software suffers from the drawback that the actual work must be edited at the same granularity at which it was entered.

In project management software, actual work is typically stored as a series of records that track the time work occurred and the total amount of actual work. Editing these records is simple at the granularity of entry, because the start time and end time are found and the total work for the existing record is changed. However, it is complex to edit these records at a different granularity from the granularity of entry. Thus, project management software typically only allows the user to view actual work at different granularities, while editing of actual work must be done at the granularity of entry.

However, editing actual work at the granularity of entry is counterintuitive to the user. The user, viewing actual work at a particular granularity, expects to be able to edit the actual work at that granularity.

Therefore, there is a need in the art for a project management program module that simplifies the process of editing actual work records. There is also a need for a project management program module that allows a user to edit actual work records in a manner that is convenient and intuitive to the user. There is a further need for a project management program module that allows a user to edit actual work records at a different granularity than the granularity of entry. There is still a further need for a project management program module that allows flexibility in editing actual work records.

SUMMARY OF THE INVENTION

The present invention satisfies the above described needs by providing a system and method for editing a sequence of actual work records. A period actual is entered, including a period actual start date, period actual end date, and a period actual work value. Before the period actual is stored as an actual work record, it is determined whether there is any overlap between the actual work records and the period actual, i.e., whether there are actual work records with a start date or end date between the period actual start date and period actual end date. If so, any overlap between the actual work records and period actual is eliminated.

Any overlapping actual work records that are completely within the period actual, i.e., with a start date and end date between the period actual start date and period actual end date, are deleted. For an overlapping actual work record that surrounds the period actual, i.e., the period actual start date and period actual end date are between the start date and end date, the end date and work value of the overlapping actual work record are modified and a new actual work record is created. For an overlapping period actual with a start date before the period actual end date and an end date equal to or between the period actual start date and period actual end date, the end date and work value are modified. For an overlapping period actual with a start date equal to or between the period actual start date and period actual end date and an end date after the period actual end date, the start date and work value are modified.

Generally described, the present invention provides a computer-implemented method for adding a new period actual to a sequence of actual work records. Each of the actual work records includes a start date, an end date, and a work amount. The new period actual comprises a period actual start date, a period actual end date, and a period actual work amount. The period actual start date and the period actual end date for the new period actual are received when the user selects a granularity and cell in a calendar. The period actual work amount is received when the user types in the actual work corresponding to the time period represented by the cell. It is determined whether any of the actual work records overlap the new period actual. Preferably, the step of determining whether any of the actual work records overlap the new period actual is accomplished by determining whether the start date or end date of one of the plurality of actual work records is between the period actual start date and the period actual end date. If so, any overlap between the overlapping actual work records and the new period actual is eliminated and the new period actual is added to the sequence of actual work records, preferably by storing the new period actual as one of the actual work records.

In another aspect, the present invention provides a method for editing a sequence of a actual work records, each actual work record comprising a start date, an end date, and a work value. A period actual, which is received, includes a period actual start date, a period actual end date, and a period actual work value. A determination is made whether there is any overlap between any of the actual work records and the period actual and, if there is overlap, then the overlap is eliminated. The period actual is then added to the sequence of actual work records.

To determine if there is overlap, a first actual work record in the sequence of actual work records is located by finding the first actual work record in the sequence that has an end date greater than or equal to the period actual start date. The start date, end date and work value of the first actual work record are referred to as a first start date, a first end date, and a first work value, respectively.

To eliminate the overlap, it is determined whether the first start date is less than the period actual start date and, if so, an amount of the first work value that is before the period actual start date is determined. An amount of the first work value that is after the period actual end date is determined. If the amount of the first work value that is before the period actual start date is zero, then the first actual work record is deleted. However, if the amount of the first work value before the period actual start date is greater than zero, then the first end date and first work value are modified. If the amount of the first work value after the period actual end date is greater than zero, then a new actual work record is created. Next, all of the actual work records contained within the period actual start date and period actual end date are deleted. A second actual work record in the sequence of actual work records is located. The second actual work record includes a second start date, a second end date, and a second work value. The second start date is less than or equal to the period actual end date and the second end date is greater than the period actual end date. If a second actual work record is located, then an amount of the second work value that is after the period actual end date is determined. If the amount of the second work value that is after the period actual end date is zero, then the second actual work record is deleted. If the amount of the second work value after the period actual end date is greater than zero, then the second start date and second work value are modified and the period actual is added to the sequence of actual work records.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIGS. 5A–5B are representations of a sequence of actual work records and a new period actual for a particular individual on a particular assignment.

DETAILED DESCRIPTION

Figure 1:
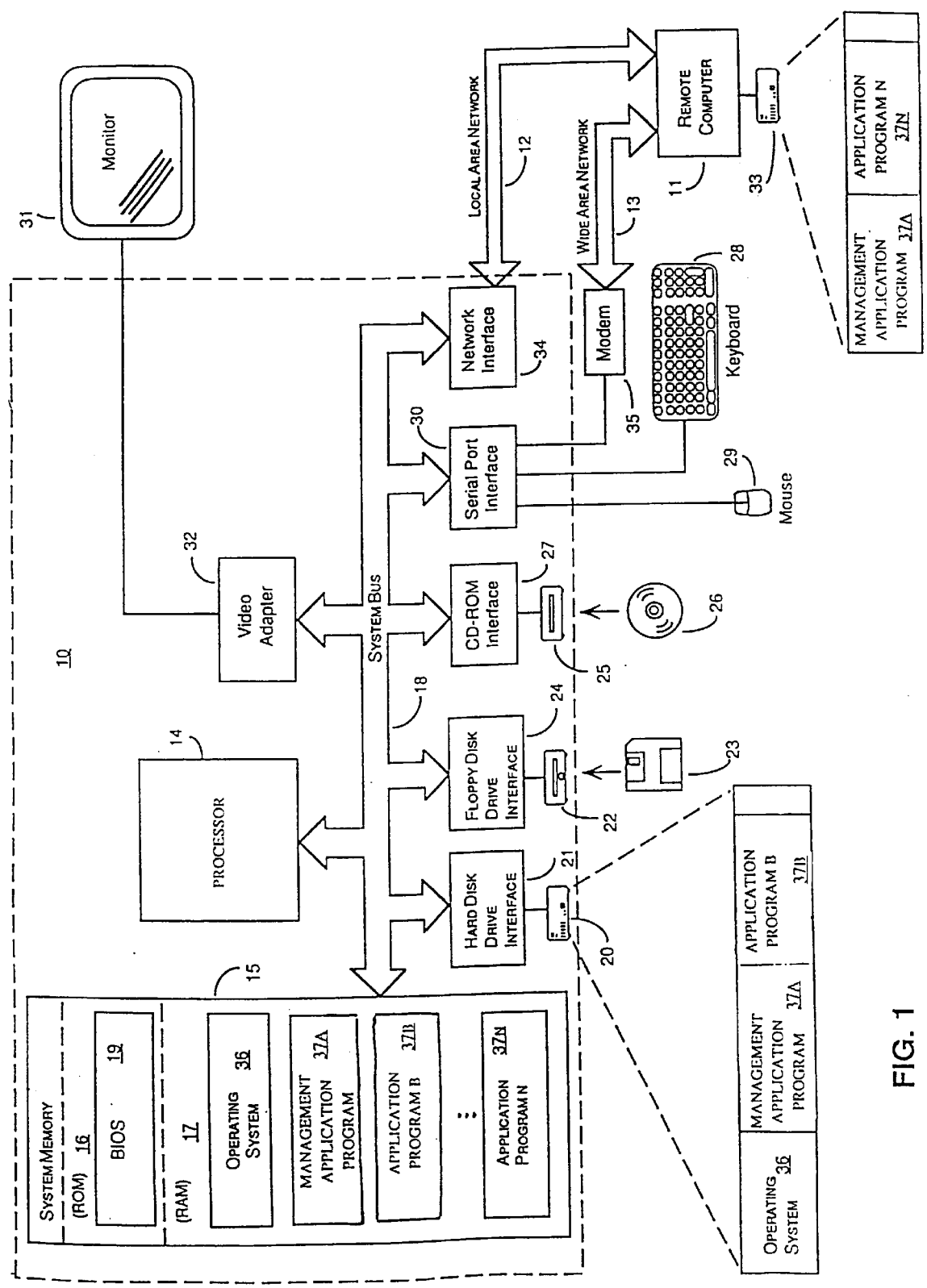
FIG. 1 is a block diagram of a computer that provides the operating environment for the preferred embodiment of the present invention.

The present invention is directed to a method and system for editing actual work records. The present invention allows an actual work record to be edited at a different granularity than the granularity at which the actual work record was created. In the preferred embodiment, the invention is incorporated into a management application program entitled "TEAM MANAGER", marketed by Microsoft Corporation of Redmond, Washington. Briefly described, the program allows a user to consolidate, coordinate and track a project team's information such as the amount of work completed, or actual work, on an assignment. For instance, "TEAM MANAGER" utilizes period actuals, preferably entered by a user, that correspond to the amount of work completed by a specific team member working on a specific assignment. The period actual is stored in a data structure called an actual work record. An actual work record is a data structure with values corresponding to an amount of completed work, and a start date and end date during which the work was completed. The present invention uniquely allows a user to enter a period actual at one granularity and edit the amount of completed work at another granularity. For instance, a user can enter a period actual at one granularity, such as weekly, and edit the amount of completed work at another granularity, such as daily.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, compute servers, and memory storage devices. Each of these conventional distributed computing components is accessible by the processor via a communication network.

The processes and operations performed by the computer include the manipulation of signals by a processor or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, calling, comparing, determining, locating, receiving, sending, storing, transferring, transmitting, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

Preferred Operating Environment

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a processor 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the processor 14 by a system bus 18. The personal computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write to a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using a keyboard 28 and/or pointing device, such as a mouse 29, which are connected to the system bus 18 via a serial port interface 30. Other types of pointing devices (not shown in FIG. 1) include track pads, track balls, and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 10, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well-known. Accordingly, additional details concerning the internal construction of the personal computer 10 need not be disclosed in connection with the present invention.

Those skilled in the art will understand that program modules such as an operating system 36, application programs 37A–37N, and data are provided to the personal computer 10 via one of the local or remote memory storage devices, which may include the local hard disk drive 20, floppy disk 23, CD-ROM 26, RAM 17, ROM 16, and the remote memory storage device 33. The application programs include a management application program 37A. In the preferred personal computer 10, the local hard disk drive 20 is used to store data and programs, including the operating system and programs.

When the personal computer 10 is turned on or reset, the Basic Input/Output System (BIOS) 19, which is stored in the ROM 16, instructs the processor 14 to load the operating system 36 from the hard disk drive 20 into the RAM 17.

Once the operating system 36 is loaded into RAM 17, the processor 14 executes the operating system 36 and causes the visual elements associated with the user interface of the operating system 36 to be displayed on the monitor 31.

The operating system 36, in conjunction with the BIOS 19 and associated device drivers, provides the basic interface between the computer's resources, the user, and the application program 37. The operating system 36 interprets and carries out instructions issued by the user. For example, when the user wants to load an application program 37, the operating system 36 interprets the instruction (e.g., double clicking on the application program's icon) and causes the processor 14 to load the program code into RAM 17 from either the local hard disk drive 20, floppy disk 23, CD-ROM 26, or the remote memory storage device 33. Once the application program 37 is loaded into the RAM 17, it is executed by the processor 14. In case of large programs, the processor 14 loads various portions of program modules into RAM 17 as needed.

As described above, the preferred embodiment of the present invention is embodied in the "TEAM MANAGER" program, which is designed to operate in conjunction with Microsoft Corporation's "WINDOWS 95" or "WINDOWS NT" operating systems, or the operating system "MacOS" used in "MACINTOSH" computers manufactured by Apple Computer, Inc. However, it should be understood that the invention can readily be implemented in other operating systems, such as Microsoft Corporation's "WINDOWS 3.1" operating system or IBM Corporation's "OS/2" operating system.

The operating system 36 provides a variety of functions or services that allow an application program 37 to easily deal with various types of input/output (I/O). This allows the application program 37 to issue relatively simple function calls that cause the operating system 36 to perform the steps required to accomplish various tasks, such as displaying text on the monitor 31 or printing text on an attached printer (not shown). Generally described, the application program 37 communicates with the operating system 36 by calling predefined functions provided by the operating system 36. The operating system 36 responds by providing the requested information in a message or by executing the requested task.

Before beginning a detailed description of the present invention, a brief description of period actuals and actual work records will be presented below.

Period Actuals and Actual Work Records

The program module "TEAM MANAGER" allows a user to enter a period actual corresponding to the actual work completed by an individual team member on a specific assignment during a time period. A period actual includes a start date, an end date, and an amount of completed work. Each period actual is associated with a specific assignment and a specific individual team member. For example, Joe works 5 hours on July 1st on assignment A. Thus, Joe enters a period actual with a start date of July 1, an end date of July 1, and an amount of completed work, or actual work, of 5 hours. This period actual would be associated with assignment A and would be associated with Joe, the individual team member who completed the work. In "TEAM MANAGER", the period actual is stored in a data structure known as an actual work record. An actual work record includes a start date, end date and an amount of completed work.

The actual work records for a specific individual on a specific assignment can be sorted sequentially by start date and end date. When a new period actual is entered by a user, the actual work records are dynamically reshaped to accommodate the new period actual in the sequence of actual work records as will be described below.

"TEAM MANAGER" also utilizes the concept of working time. Working time is the time available for scheduling and completing work. The typical work week is Monday through Friday 8 A.M. to 12 P.M. and 1 P.M. to 5 P.M., although the user can change these times and days. Thus, there are 40 hours of working time in a typical work week.

"TEAM MANAGER" utilizes working time when editing and displaying actual work records. For instance, suppose a user enters 40 hours of actual work, at a weekly granularity, for the week of Sunday, March 31–Saturday, April 6. The actual work was entered at a weekly granularity, so there is no indication from the user as to the manner of distributing this actual work on a daily basis. Thus, when the user views the actual work for the week of Sunday, March 31–Saturday April 6 on a daily basis, the actual work is distributed using working time. The 40 hours of actual work is evenly distributed over the working time in the week. Thus, in this example, 0 hours of actual work will be displayed for Sunday, March 31, 8 hours for Monday, April 1, 8 hours for Tuesday, April 2, 8 hours for Wednesday, April 3, 8 hours for Thursday, April 4, 8 hours for Friday, April 5 and 0 hours for Saturday, April 6.

The interaction between working time and the method of the present invention for editing actual work records will be described in detail below.

Figure 2A:
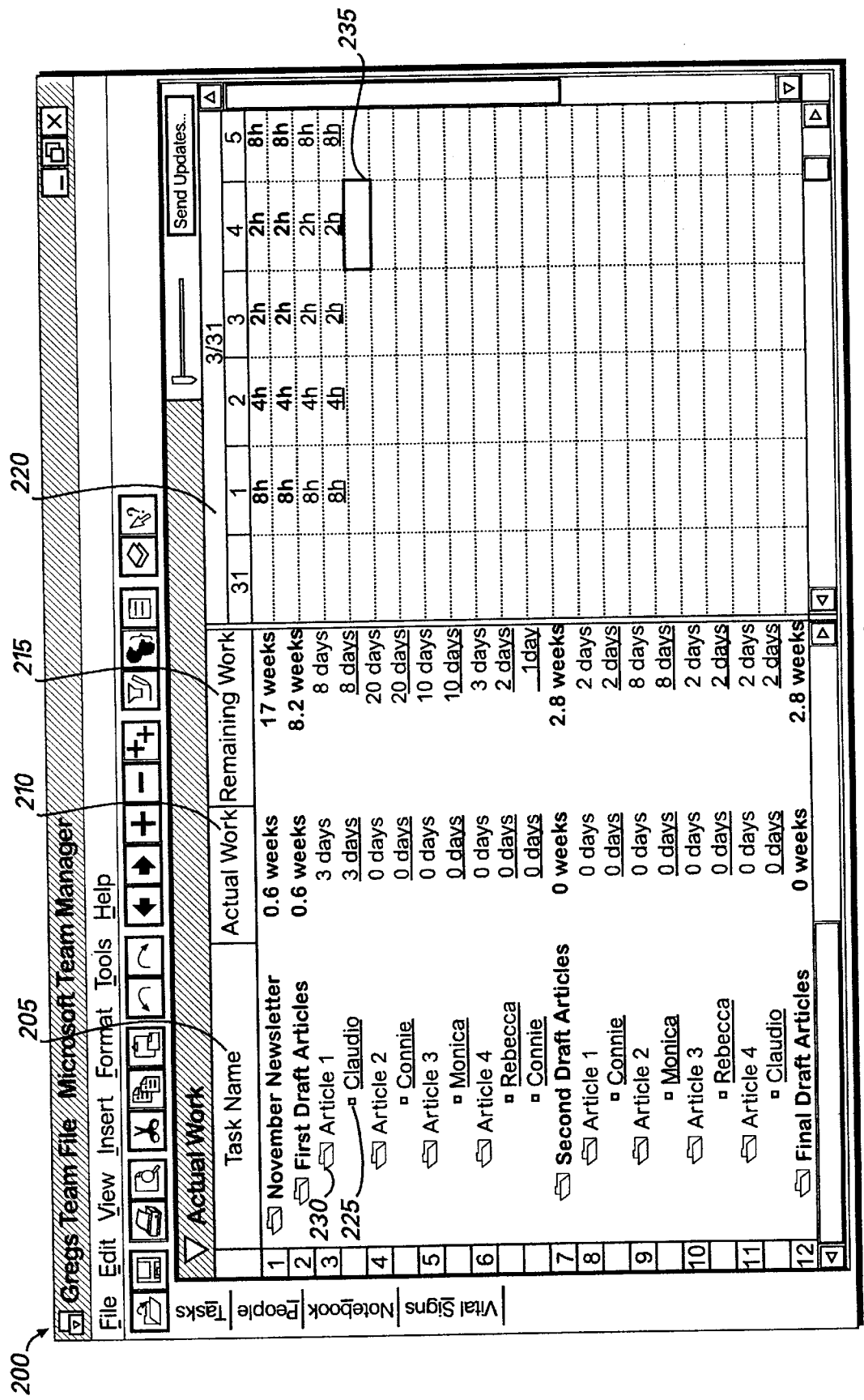
FIGS. 2A–2D are illustrations of a user interface that is displayed to the user in the preferred application program module.

Turning now to FIGS. 2A–2D, a brief description of the user interface of "TEAM MANAGER" and the manner in which a user enters period actuals will be presented. FIGS. 2A–2D are illustrations of the user interface 200 that is presented to the user when viewing, entering, and editing period actuals in the preferred management application program module. Referring to FIG. 2A, the user interface 200 includes a task name column 205, an actual work column 210, a remaining work column 215 and a scrolling calendar 220. Under the task name column 205 is an assignment 225 of task 230 to an individual team member, "Claudio". The actual work column 210 includes the total amount of actual work, 3 days (in working time), that Claudio has completed on this assignment. The remaining work column 215 includes an indication of the total amount of work, 8 days (in working time), remaining on this assignment.

Still referring to FIG. 2A, the scrolling calendar 220 can be displayed at different granularities, such as, but not limited to, daily, weekly, biweekly, monthly and quarterly. In FIG. 2A, the scrolling calendar 220 is displayed at a daily granularity. Each column in the scrolling calendar 220 represents a day when the scrolling calendar is displayed at a daily granularity. To enter or edit a period actual, the user selects a cell and enters an amount of actual work. A cell that has been selected appears with a bold outline, such as cell 235 in FIG. 2A. Each cell represents a start date and an end date based upon the granularity of the scrolling calendar.

Referring to FIG. 2A, actual work has been entered for Claudio of 8 hours on April 1, 4 hours on April 2, 2 hours on April 3, 2 hours on April 4 and 8 hours on April 5. Although not shown to the user, each of these period actuals is stored as a separate actual work record.

Figure 2B:
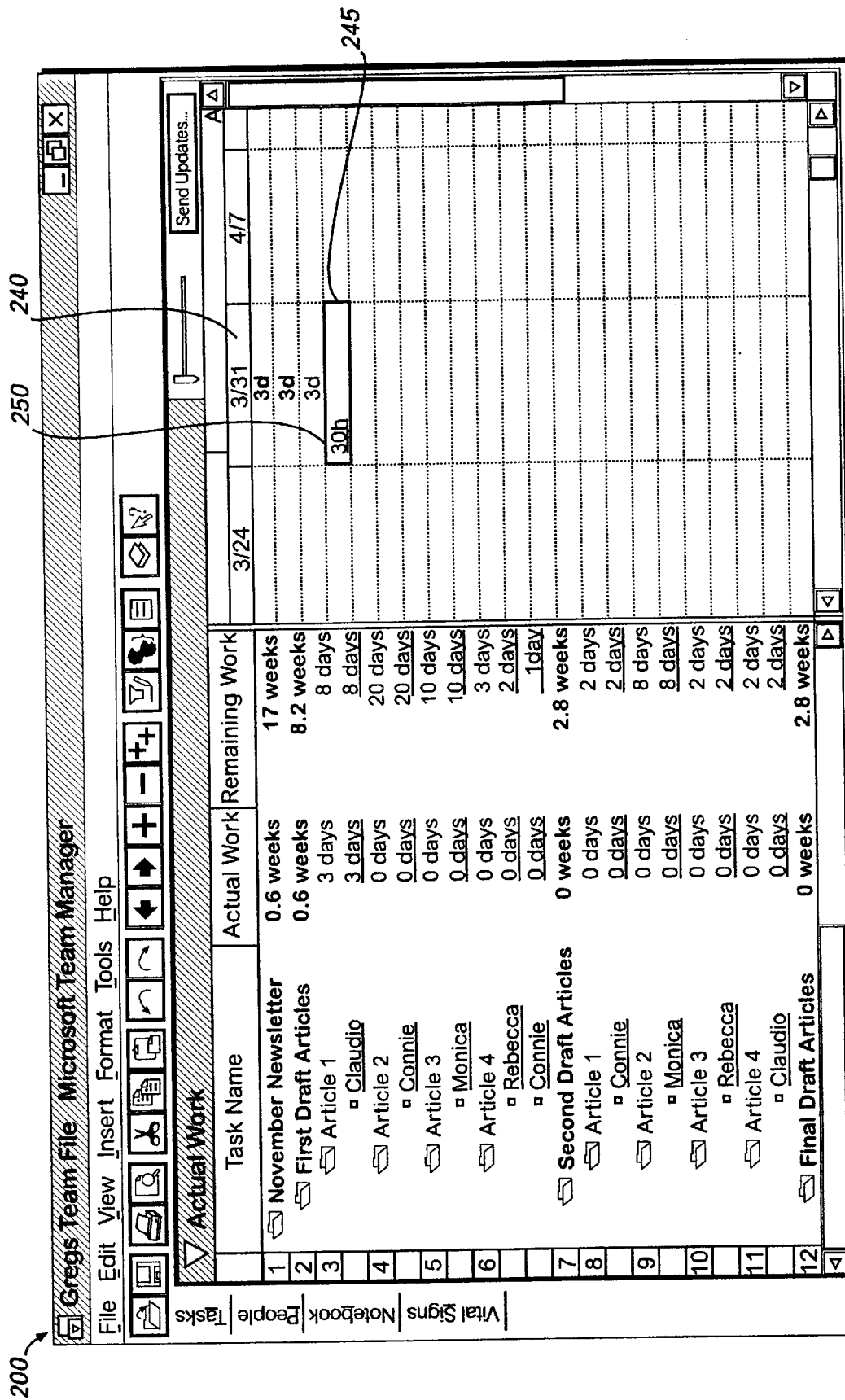

Referring now to FIG. 2B, the granularity of the scrolling calendar has been changed to a weekly granularity. Thus, in FIG. 2B, each column in the scrolling calendar represents a week. For instance, column 240 represents the week beginning on Sunday, March 31. Cell 245 has been selected. A cell is preferably selected by the user clicking a button on the mouse 29 (FIG. 1) while a cursor is positioned over the cell. An edited actual work value 250, 30 hours, is being entered for the week of March 31.

Figure 2C:
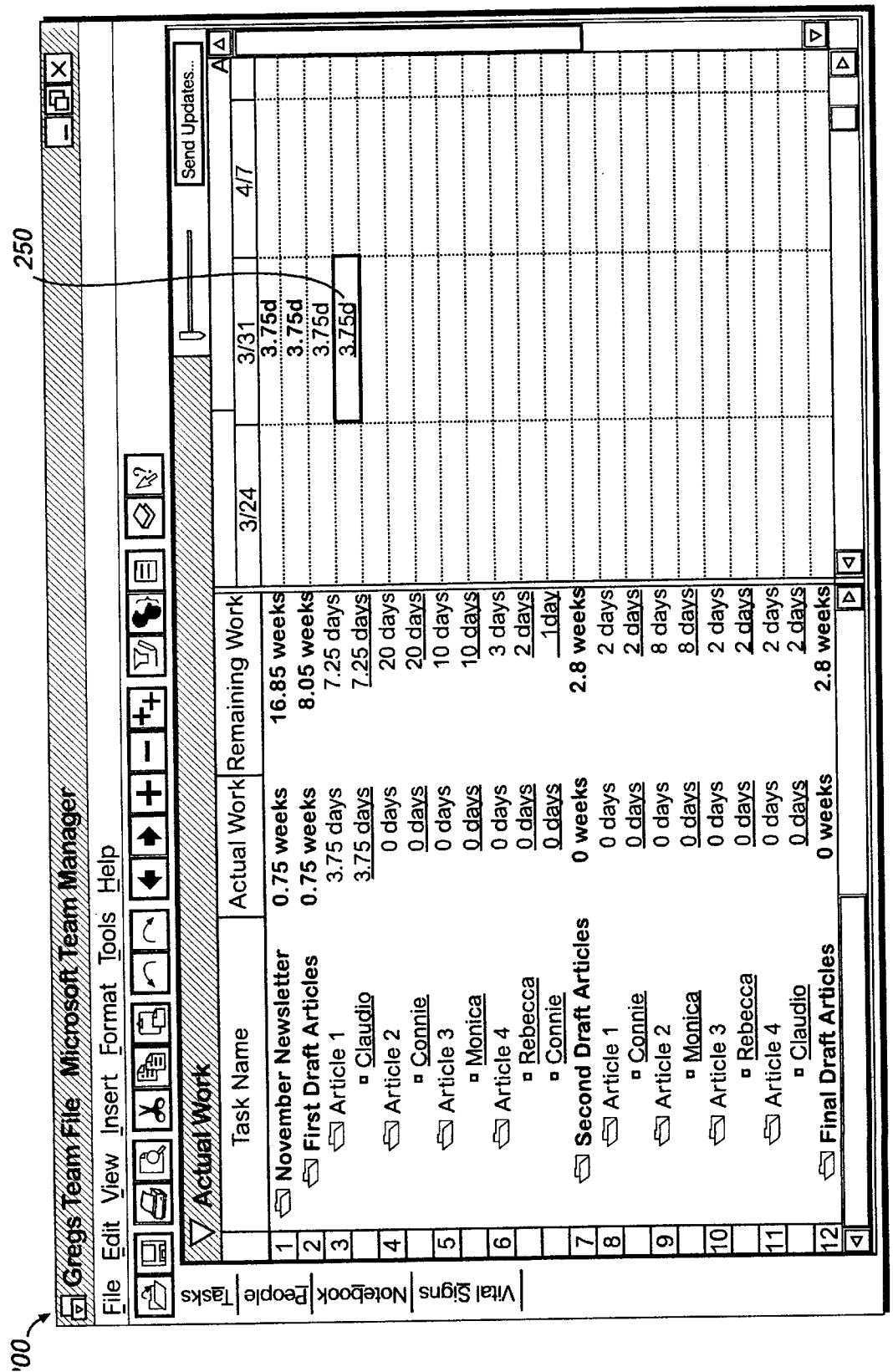

Referring now to FIG. 2C, the actual work value 250 has been entered for the week of March 31, such as by the user pressing the return key on keyboard 28. It should be noted that actual work value 250 is displayed as 3.75 days (in working time) once it is entered based on the following calculation (30 hours * 1 day working time/8 hours).

Figure 2D:
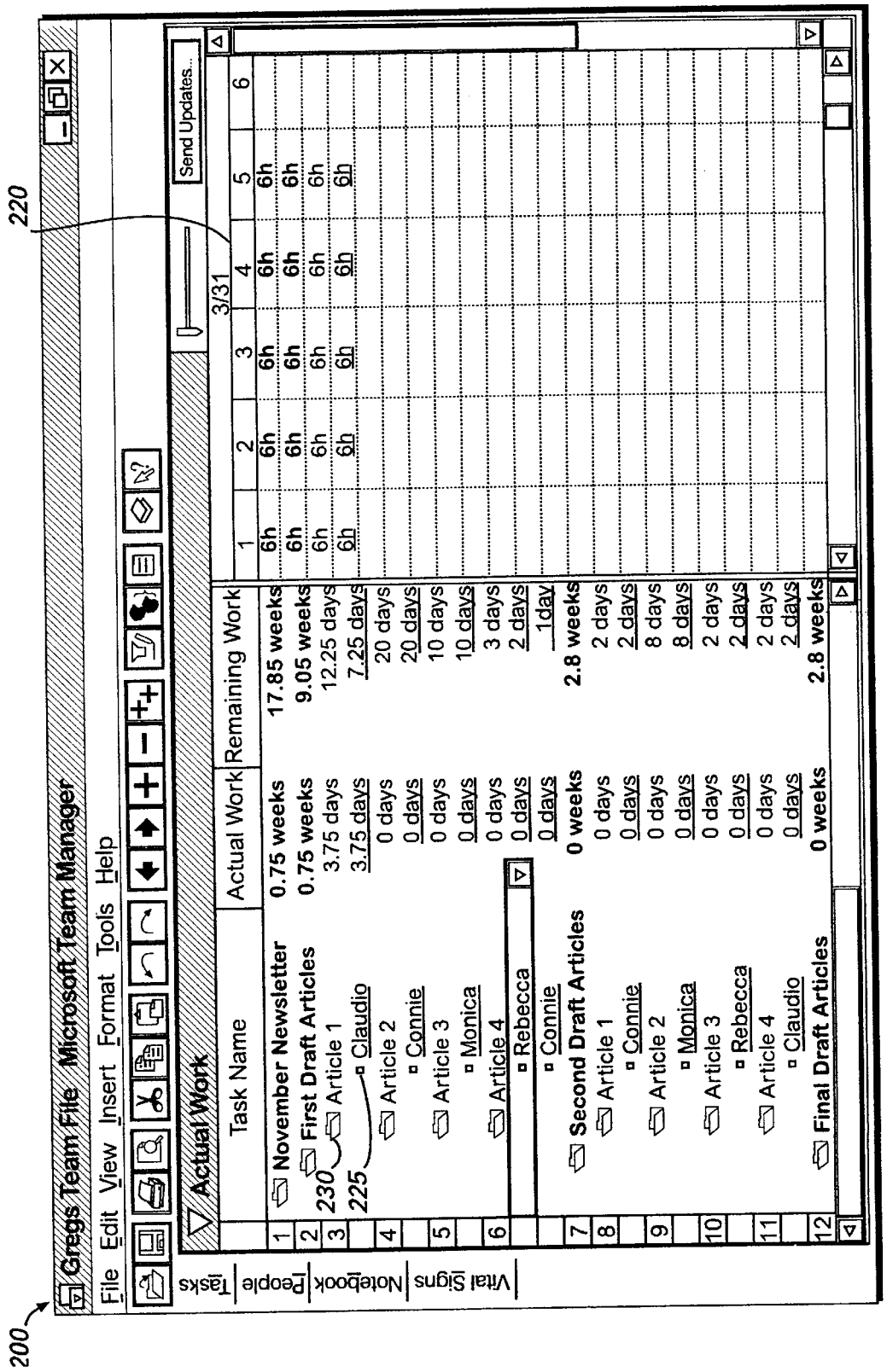

Referring to FIG. 2D, the granularity of the scrolling calendar 220 has been changed to a daily granularity. The days of Monday, April 1 through Friday, April 5 each include 6 hours of actual work based upon evenly distributing 3.75 days, or 30 hours, of actual work over the working time in the week of April 31.

Thus, it should be noted that the user can enter a period actual at any granularity. These period actuals are stored as actual work records. The user can view the actual work records at different granularities. The present invention uniquely allows the user to edit an actual work record at any granularity regardless of the granularity of entry.

Editing Actual Work Records

Briefly described, the present invention provides a method and system for editing actual work records. A period actual is entered by a user and stored as an actual work record. The actual work records can be sorted sequentially by start date and end date. When the start date or end date of an actual work record is between the start date and end date of the new period actual, then there is a condition known as overlap. Overlap needs to be eliminated because the actual work records are sequential and only one actual work record is used to represent the amount of completed work for a specific time period. When an actual work record overlaps the new period actual entered by a user, then the actual work record is dynamically reshaped or deleted to eliminate the overlap.

Figure 3:
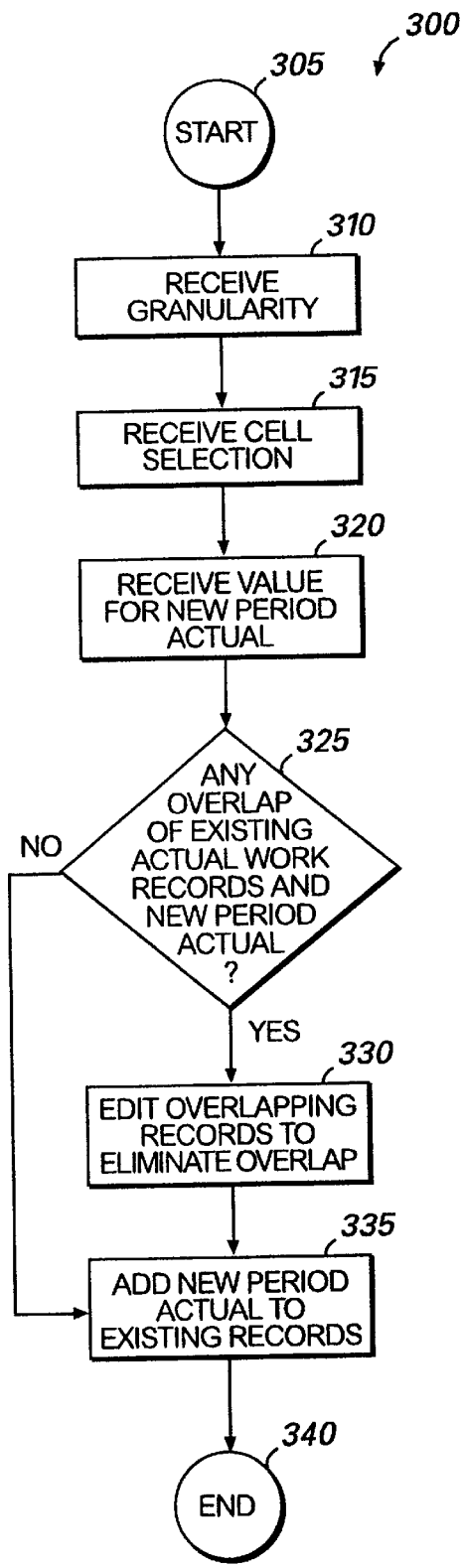
FIG. 3 is a flow chart illustrating an embodiment of the present invention for editing actual work records.

FIG. 3 is a flow chart generally illustrating an embodiment of the present invention for editing actual work records. Those skilled in the art will appreciate that this exemplary embodiment is a computer-implemented process that is carried out by the computer in response to input from the user and instructions provided by the preferred application program module.

The method 300 begins at start step 305 and proceeds to step 310 when the user selects a granularity for entering a new period actual and this granularity is received by the preferred application program module. Common granularities are daily, weekly, biweekly, semimonthly, monthly and quarterly. However, the preferred application program module supports any arbitrary granularity entered by the user. For instance, the user may select a granularity of 4 days or a year, just to name a couple of granularities.

The user selects a cell and the cell selection of the user is received by the preferred application program module at step 315. For example, if the user selects a weekly granularity, then the user selects a cell corresponding to the week for which the user wishes to edit or enter a period actual.

At step 320, the user enters a value for the new period actual and this value is received by the preferred application program module. Preferably, the value corresponds to the actual work, or completed work, for the time period represented by the cell selected at step 315.

It is determined whether any of the actual work records overlap the new period actual at decision step 325. Preferably, this is accomplished by determining whether any of the start dates or end dates of any of the actual work records are equal to or between the start date and end date of the new period actual.

If any of the actual work records overlap the new period actual, then the method proceeds to step 330. The overlapping actual work records are edited at step 330 to eliminate any overlap between the actual work records and the new period actual. Preferably, step 330 is accomplished by changing the start date, the end date, or the completed work of the actual work record, or by deleting the actual work record.

If, at decision step 325, it is determined that no actual work record overlaps the new period actual, then the new period actual is added to the actual work records at step 335. The new period actual is also added to the actual work records at step 335 after any overlapping actual work records have been edited at step 330. The method 300 ends at step 340. Having briefly described an embodiment of the present invention for editing actual work records, the preferred method of the present invention will be described below.

Figure 4A:
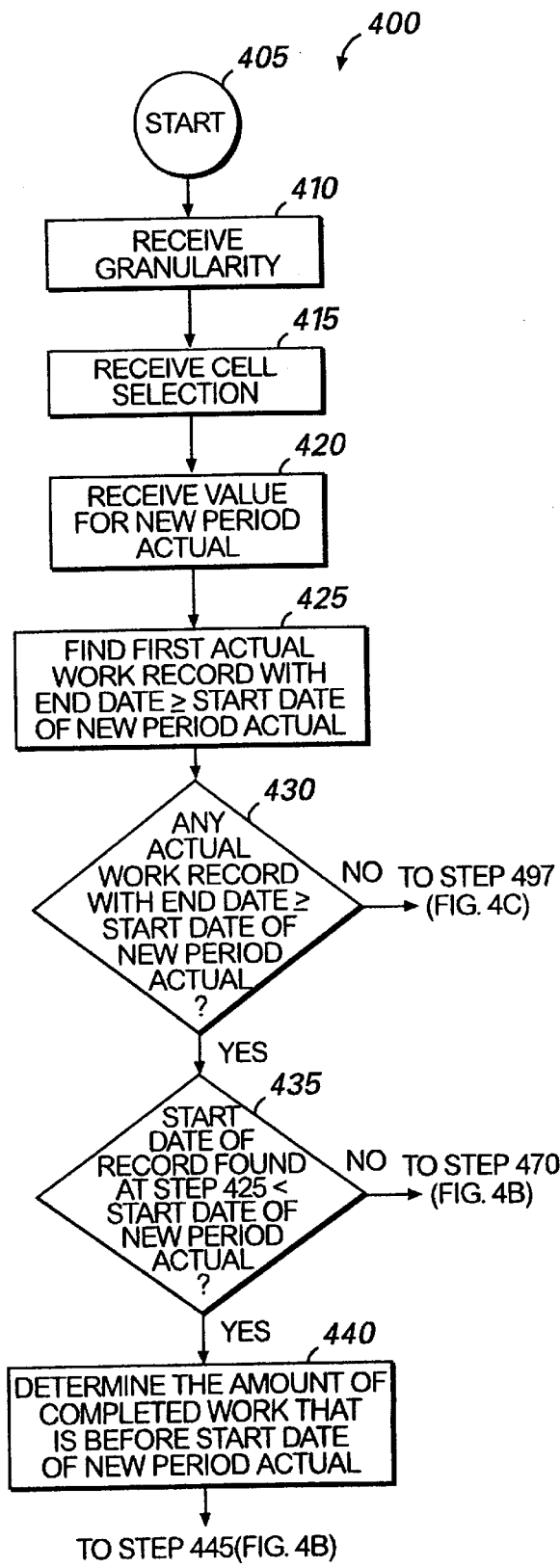
FIGS. 4A–4C are flow charts illustrating the preferred method of the present invention for editing actual work records.
Figure 4B:
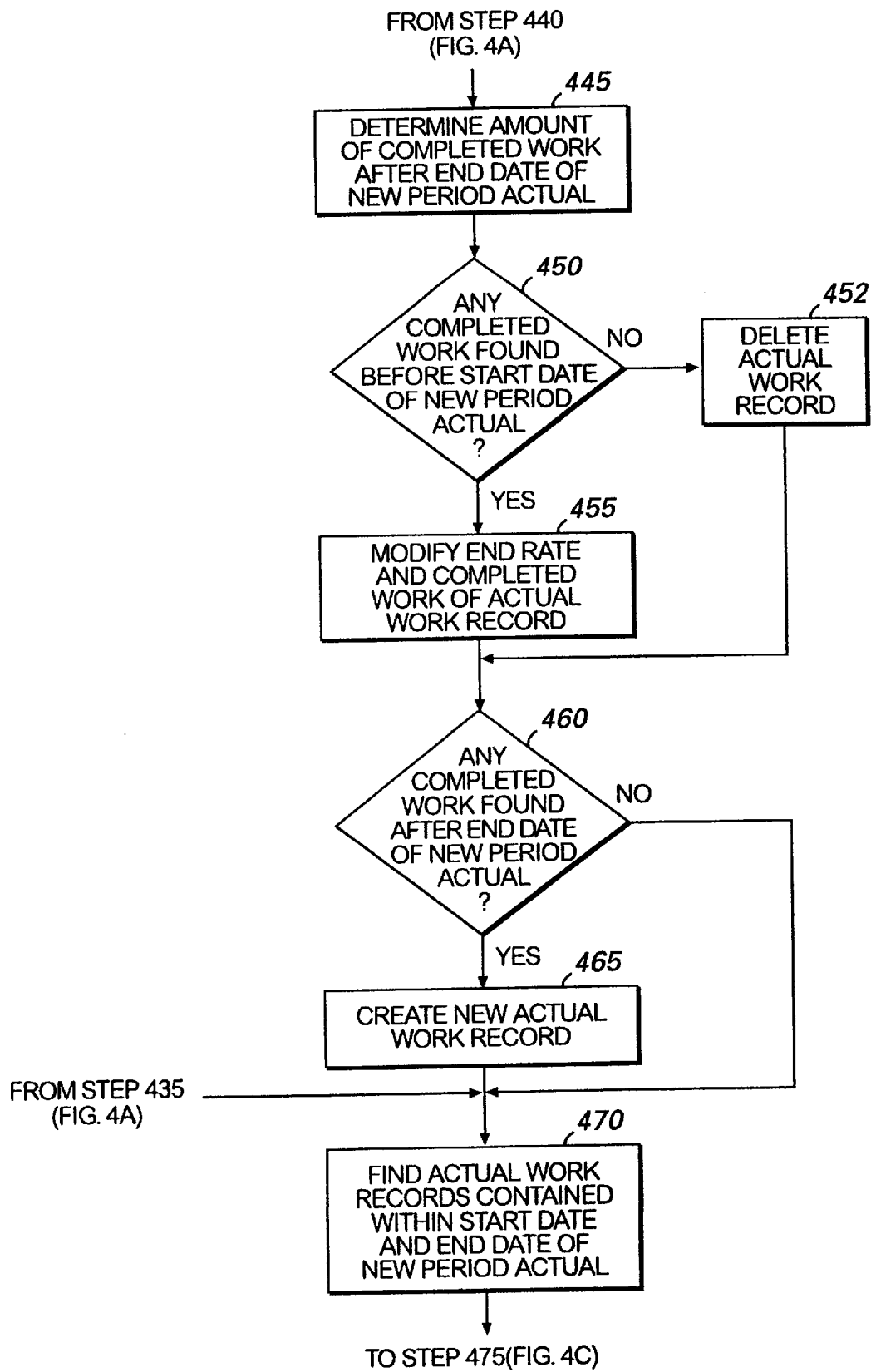
Figure 4C:
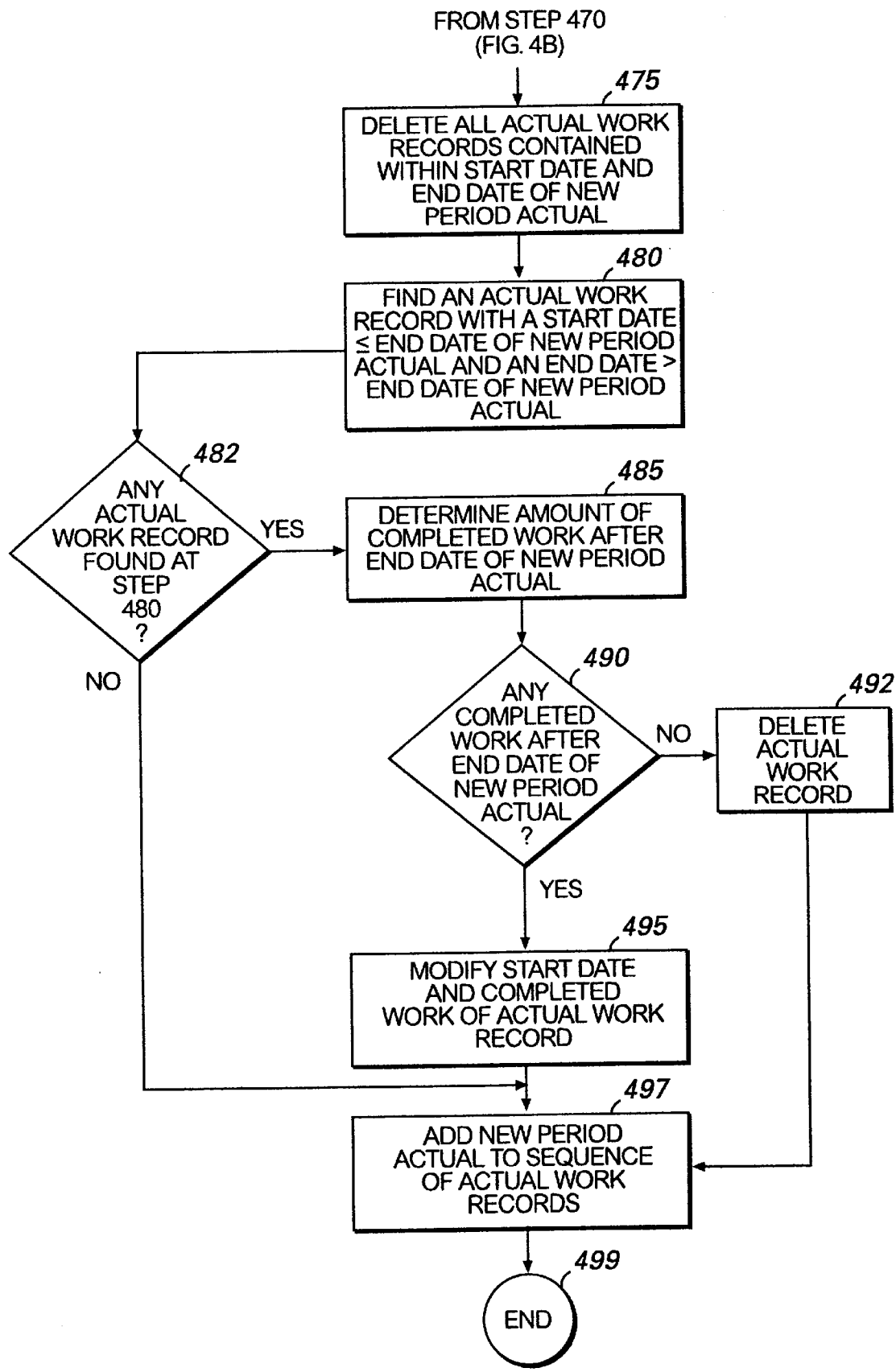

FIGS. 4A–4C are flow charts illustrating the preferred method 400 of the present invention for editing actual work records. Referring now to FIG. 4A, the method 400 begins at step 405 and proceeds to step 410 when the user selects a granularity for entering a new period actual and this granularity is received by the preferred application program module. The user selects a cell and the cell selection of the user is received by the preferred application program module at step 415. At step 420, the user enters a value for the new period actual and this value is received by the preferred application program module. Preferably, the value entered at step 420 represents the actual work, or completed work, for the time period represented by the cell that was selected at step 415.

At step 425, the first actual work record with an end date greater than or equal to the start date of the new period actual is found. Preferably, this is accomplished by searching sequentially, from a date less than the start date of the new period actual, through the actual work records until an actual work record with an end date greater than or equal to the start date of the new period actual is found.

At decision step 430, it is determined whether any actual work record with an end date greater than or equal to the start date of the new period actual was found at step 425. If not, then the method proceeds to step 497 (FIG. 4C) and the new period actual is added to the sequence of actual work records. After step 497, the method ends at step 499 (FIG. 4C).

However, if at decision step 430, an actual work record with an end date greater than or equal to the start date of the new period actual is found, then the method proceeds to decision step 435.

At decision step 435, it is determined whether the start date of the actual work record found at step 425 has a start date that is less than the start date of the new period actual. If not, then the method proceeds to step 470 which will be described below in reference to FIG. 4B.

However, if at decision step 435, it is determined that the start date of the actual work record found at step 425 has a start date that is less than the start date of the new period actual, then the method proceeds to step 440.

At step 440, the amount of completed work in the actual work record found at step 425 that is before the start date of the new period actual is determined. Preferably, step 440 is accomplished using the following technique. The amount of completed work for the actual work record is determined. The amount of completed work for the actual work record is the amount of completed work stored in the actual work record. The working time of the actual work record that is before the start date of the new period actual is determined.

The working time is the time available in the calendar for scheduling work. The typical work week is Monday through Friday, 8 A.M. to 12 P.M. and then 1 P.M. to 5 P.M., although the user can modify these times and days. Thus, there are 40 hours of working time available in a typical work week.

The total working time for the entire actual work record is then determined. Finally, the amount of completed work in the actual work record that is before the start date of the new period actual is found by using the following formula:

$$\text{Completed work} \times \left[ \frac{\text{working time before start date of new period actual}}{\text{working time of entire actual work record}} \right].$$

After determining the amount of completed work in the actual work record that is before the start date of the new period actual at step 440, the method proceeds to step 445. Referring now to FIG. 4B, the amount of completed work in the actual work record found at step 425 that is after the end date of the new period actual is determined at step 445. Preferably, step 445 is accomplished using the following technique. The amount of completed work for the actual work record is determined. The amount of completed work is the amount of completed work stored in the actual work record. The working time of the actual work record after the end date of the new period actual is determined. The total working time for the actual work record is then determined. Finally, the amount of completed work in the actual work record that is after the end date of the new period actual is found by using the following formula:

$$\text{Completed work} \times \left[ \frac{\text{working time after end date of new period actual}}{\text{working time of entire actual work record}} \right].$$

At decision step 450, it is determined whether there was any completed work found at step 440 that was before the start date of the new period actual. If not, then the actual work record is deleted at step 452 and the method proceeds to step 460, described below.

However, if at decision step 450, it is determined that there was some completed work found at step 440, then the method proceeds to step 455. The end date and completed work of the actual work record are modified at step 455. Preferably, the end date of the actual work record is modified to be the day before the start date of the new period actual. The completed work is preferably modified to be equal to the amount of completed work in the actual work record that is before the start date of the new period actual, as found at step 440. After the end date and completed work of the actual work record are modified at step 455, the method proceeds to decision step 460.

At decision step 460, it is determined whether there was any completed work found at step 445 that was after the end date of the new period actual. If not, then the method proceeds to step 470, described below.

However, if at decision step 460, it is determined that completed work was found at step 445, then the method proceeds to step 465. A new actual work record is created at step 465. Preferably, the new actual work record has a completed work value equal to the amount of completed work that was found after the end date of the new period actual, as found at step 445. The new actual work record preferably has a start date equal to the day after the end date of the new period actual. The new actual work record also preferably has an end date equal to the end date of the actual work record found at step 425. After the new actual work record is created at step 465, the method proceeds to step 470.

At step 470, any actual work records contained within the period of the new period actual are found, i.e., actual work records contained within the start date and end date of the new period actual are found. Preferably, step 470 is accomplished by finding all actual work records with a start date greater than or equal to the start date of the new period actual and an end date that is less than or equal to the end date of the new period actual.

Referring now to FIG. 4C, at step 475, all actual work records contained within the new period actual, i.e., all records found at step 470, are deleted. At step 480, any actual work record which has a start date less than or equal to the end date of the new period actual and which has an end date greater than the end date of the new period actual is found. The method then proceeds to decision step 482, where an inquiry is conducted to determine whether an actual work record was found at step 480. If not, then the method proceeds to step 497, described below. If, however, an actual work record is found at step 480, then the method proceeds to step 485.

Using the actual work record found at step 480, a determination is made at step 485 of the amount of completed work that is after the end date of the new period actual. Preferably, step 485 is accomplished using the following technique. The amount of completed work for the actual work record found at step 480 is determined. The amount of completed work for the actual work record is the amount of completed work stored in the actual work record. The working time of the actual work record after the end date of the new period actual is also determined.

The total working time for the actual work record is determined. Finally, the amount of completed work in the actual work record that is after the end date of the new period actual is found by using the following formula:

$$\text{Completed work} \times \left[ \frac{\text{working time after end date of new period actual}}{\text{working time of entire actual work record}} \right].$$

After the amount of completed work after the end date of the new period actual is computed at step 485, the method proceeds to decision step 490. At decision step 490, it is determined whether there was any completed work found at step 485 that was after the end date of the new period actual. If not, then the actual work record found at step 480 is deleted at step 492 and the method proceeds to step 497, described below.

However, if at decision step 490, it is determined that there was some completed work found at step 485, then the method proceeds to step 495. The start date and completed work of the actual work record found at step 480 are modified at step 495. Preferably, the start date of the actual work record is modified to be equal to the day after the end date of the new period actual. The completed work is preferably modified to be equal to the amount of completed work in the actual work record that is after the end date of the new period actual, as found at step 485. After the end date and completed work of the actual work record are modified at step 495, the method proceeds to step 497.

At step 497, the new period actual is added to the sequence of the actual work records. Preferably, the new period actual is added to the sequence of actual work records by being stored as an actual work record. The method then ends at step 499.

The method of editing actual work records as illustrated by FIGS. 4A–4C can be better understood in the context of the following representative examples.

Representative Example 1

Consider the representative example shown in FIG. 5A. FIG. 5A is a representation of a sequence of actual work records and a new period actual for a particular individual on a particular assignment. It should be understood that FIG. 5A is only a representation so that the method of editing actual work records can be better understood and is not an illustration of the display to the user. FIG. 5A includes a calendar 500 so that the start date and end date of each actual work record can be seen. Representations of actual work records 505, 510 and 515 are shown. Actual work record 505 has a start date 520 and an end date 525. Actual work record 510 has a start date 525 and an end date 530. Actual work record 515 has a start date 530 and an end date 535.

The representations of the actual work records 505, 510, 515 each include an amount of completed work 540, 545, 550, respectively. Actual work record 505 has a start date 520 of April 1, an end date 525 of April 2, and an amount of completed work 540 of 10 hours. Actual work record 510 has a start date 525 of April 3, an end date 530 of April 3 and an amount of completed work 545 of 4 hours. Actual work record 515 has a start date 530 of April 4, an end date 535 of April 5 and an amount of completed work 550 of 8 hours.

FIG. 5A also includes a representation of a new period actual 555 with a start date 560 of April 2, an end date 565 of April 4, and an amount of completed work 570 of 20 hours.

Having briefly described FIG. 5A, a description of the method 400 in which actual work records are edited will be described below in reference to FIGS. 4A–4C and FIGS. 5A–5B. At step 405 the method begins and proceeds to step 410 when the user selects a granularity. In this example, the user selects a granularity of 3 days. The method proceeds to step 415 when the user selects the cell (not shown) corresponding to the period of Tuesday April 2 to Thursday April 4. At step 420, the user enters 20 hours into the cell that was selected at step 415. Thus, the new period actual 555 is entered with a start date of April 2, an end date of April 4, and an amount of completed work of 20 hours.

At step 425, the first actual work record with an end date greater than or equal to the start date of the new period actual is found. Actual work record 505 is found at step 425 because its end date 525 (April 2) is equal to the start date 560 (April 2) of the new period actual 555.

At decision step 430, it is determined that an actual work record 505 with an end date greater than or equal to the start date of the new period actual was found at step 425. Thus, the method proceeds to decision step 435. It is determined that the start date of the actual work record found at step 425 has a start date 520 (April 1) that is less than the start date 560 (April 2) of the new period actual and the method proceeds to step 440.

At step 440, the amount of completed work in the actual work record 505 that is before the start date of the new period actual 555 is determined to be 10 hours. The working time of the actual work record 505 before the start date of the new period actual 555 is determined. Thus, for this example, the working time before the start date 560 (April 2), is the working time on Monday April 1, which is 8 hours.

The working time for the actual work record 505 is then determined. For this example, the working time is the working time for Monday April 1 and Tuesday April 2, which is 16 hours. Finally, the amount of completed work in the actual work record 505 that is before the start date of the new period actual is found by using the following formula:

$$\text{Completed work} \times \left[ \frac{\text{working time before start date of new period actual}}{\text{working time of entire actual work record}} \right]$$

which would be [10 hours * (8 hours/16 hours)], or 5 hours in this example.

The amount of completed work in the actual work record that is after the end date of the new period actual is determined at step 445. The amount of completed work for the actual work record is determined, which is 10 hours in this example. The working time of the actual work record 505 after the end date of the new period actual 555 is determined. In this example, the working time of the actual work record 505 after the end date of the new period actual 555 is equal to zero because the actual work record 505 does not extend beyond the end date of the new period actual 555.

The working time for the actual work record 505 is then determined. The working time for the actual work record 505 is equal to 16 hours in this example. Finally, the amount of completed work in the actual work record 505 that is after the end date of the new period actual 555 is found by using the following formula:

$$\text{Completed work} \times \left[ \frac{\text{working time after end date of new period actual}}{\text{working time of entire actual work record}} \right]$$

which would be [(10 hours * 0 hours/16 hours)], or zero hours in this example.

After determining at step 450 that there was completed work found before the start date of the new period actual, the end date and completed work of the actual work record 505 are modified at step 455. The end date of the actual work record 505 is modified to be equal to the day before the start date 560 of the new period actual, or (April 1). The completed work 540 is preferably modified to be equal to the amount of completed work in the actual work record that is before the start date of the new period actual (5 hours), as found at step 440.

At decision step 460, it is determined that there was not any completed work found at step 445 that was after the end date of the new period actual 555, so the method proceeds to step 470.

At step 470, all actual work records with a start date greater than or equal to the start date 555 of the new period actual 560 and an end date that is less than or equal to the end date 565 of the new period actual 560 are found. In this example, actual work record 510 meets these criteria because its start date 525 (April 3) is greater than the start date 560 (April 2) of the new period actual 555 and its end date 530 (April 3) is less than the end date 565 (April 4) of the new period actual 555.

At step 475, actual work record 510 is deleted. The method 400 then proceeds to step 480. At step 480, any actual work record which has a start date less than or equal to the end date 565 of the new period actual 555 and which has an end date greater than the end date 565 of the new period actual 555 is found. Actual work record 515 is found at step 480. The method then proceeds to decision step 482. At decision step 482, it is determined that an actual work record was found at step 480 and the method proceeds to step 485.

A determination of the amount of completed work in the actual work record 515 found at step 480 that is after the end date 565 of the new period actual 555 is performed at step 485. The amount of completed work for the actual work record 515 is 8 hours. The working time of the actual work record 515 after the end date 565 of the new period actual 555 is determined as 8 hours on Friday April 5.

The working time for the actual work record 515 is then determined. The working time is 16 hours (8 hours on Thursday April 4 and 8 hours on Friday April 5). Finally, the amount of completed work in the actual work record 515 that is after the end date 565 of the new period actual 555 is found by using the following formula:

$$\text{Completed work} \times \left[ \frac{\text{working time after end date of new period actual}}{\text{working time of entire actual work record}} \right]$$

which is [8 hours * (8 hours/16 hours)], or 4 hours in this example.

At decision step 490, it is determined that there was completed work found at step 485 that was after the end date 565 of the new period actual 555, so the method proceeds to step 495. The start date 530 and completed work 550 of the actual work record 515 are modified at step 495. The start date 530 of the actual work record 515 is modified to be equal to the day after the end date 565 of the new period actual 555, or (April 5). The completed work is preferably modified to be equal to the amount of completed work in the actual work record 515 that is after the end date 565 of the new period actual 555, or 4 hours as found at step 485. After the end date and completed work of the found actual work record are modified at step 495, the method proceeds to step 497.

At step 497, the new period actual 555 is stored as an actual work record and added to the sequence of the actual work records. The method 400 then ends at step 499. FIG. 5B shows the sequence of actual work records after the new period actual 555 has been stored and added to the sequence of actual work records. Actual work records 505 and 515 have been modified and actual work record 510 has been deleted.

Representative Example 2

Figure 6A:
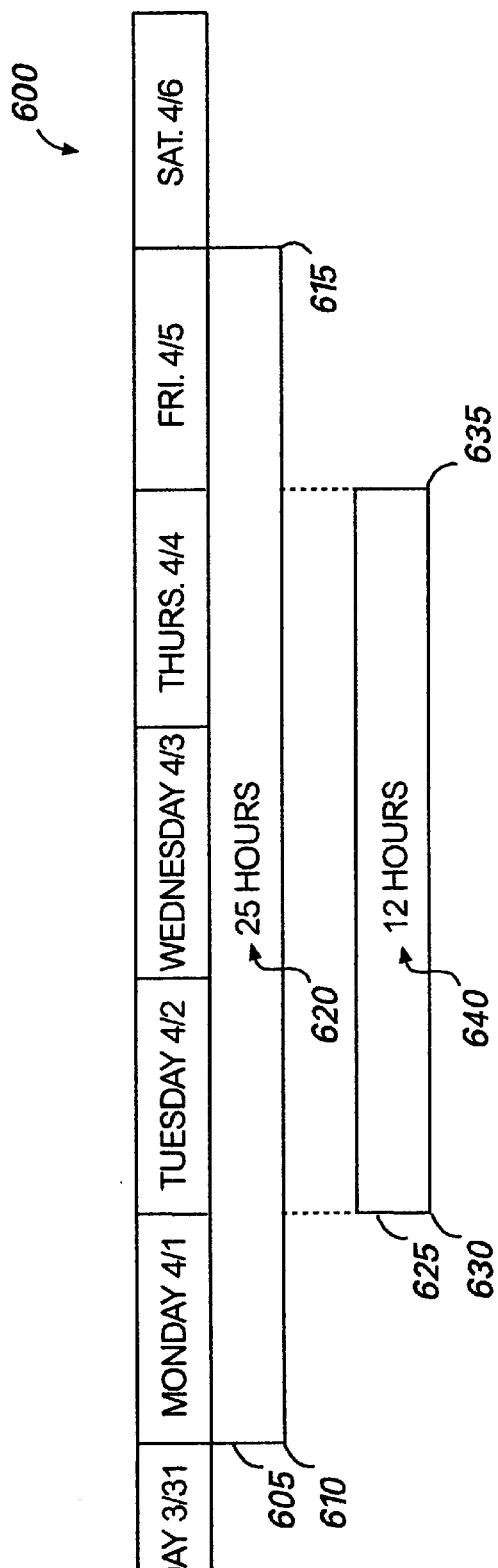
FIGS. 6A–6B are representations of a sequence of actual work records and a new period actual for a particular individual on a particular assignment.

Consider the representative example shown in FIG. 6A. FIG. 6A is a representation of a sequence of actual work records and a new period actual for a particular individual on a particular assignment. It should be understood that FIG. 6A is only a representation so that the method of editing actual work records can be better understood and is not an illustration of the display to the user. FIG. 6A includes a calendar 600 so that the start date and end date of each actual work record can be seen. A representation of an actual work record 605 is shown. Actual work record 605 has a start date 610 (April 1), an end date 615 (April 5), and an amount of completed work 620 (25 hours). FIG. 6A also includes a representation of a new period actual 625 with a start date 630 (April 2), an end date 635 (April 4), and an amount of completed work 640 (12 hours).

Having briefly described FIG. 6A, a description of the method 400 in which actual work record 605 is edited and new period actual 625 is added to the sequence of actual work records will be described below in reference to FIGS. 4A–4C and FIGS. 6A–6B.

The method 400 begins at step 405 and proceeds to step 410 when the user selects a granularity. In this example, the user selects a granularity of 3 days. The method proceeds to step 415 when the user selects the cell (not shown) corresponding to the period of Tuesday April 2 to Thursday April 4. At step 420, the user enters 12 hours into the cell that was selected at step 415. Thus, the new period actual 625 has been entered with a start date of April 2, an end date of April 4, and an amount of completed work of 12 hours.

At step 425, the first actual work record with an end date greater than or equal to the start date of the new period actual is found. Thus, actual work record 605 is found at step 425 since its end date 615 (April 5) is greater than the start date 630 (April 2) of the new period actual 625.

At decision step 430, it is determined that an actual work record 605 with an end date greater than or equal to the start date 630 of the new period actual 625 was found at step 425 and the method proceeds to decision step 435.

At decision step 435, it is determined that the actual work record 605 found at step 425 has a start date 610 (April 1) that is less than the start date 630 (April 2) of the new period actual 625 and the method proceeds to step 440.

At step 440, the amount of completed work in the actual work record 605 that is before the start date 630 of the new period actual 625 is determined. The amount of completed work for the actual work record is 25 hours. The working time of the actual work record 605 before the start date 630 of the new period actual 625 is determined to be 8 hours on April 1. The working time for the actual work record 605 is determined to be 40 hours (8 hours on Monday April 1, 8 hours on Tuesday April 2, etc.). Finally, the amount of completed work in the actual work record 605 that is before the start date 630 of the new period actual 625 is found by using the following formula:

$$\text{Completed work} \times \left[ \frac{\text{working time before start date of new period actual}}{\text{working time of entire actual work record}} \right]$$

which is equal to [25 hours * (8 hours/40 hours)], or 5 hours in this example.

After determining, at step 440, the amount of completed work in the actual work record 605 that is before the start date 630 of the new period actual 625, the method proceeds to step 445. The amount of completed work in the actual work record 605 that is after the end date 635 of the new period actual 625 is determined at step 445. In this example, the amount of completed work for the actual work record 625 is 25 hours. The working time of the actual work record 605 after the end date 635 of the new period actual 625 is 8 hours on Friday April 5. The total working time for the actual work record 625 is 40 hours. Finally, the amount of completed work in the actual work record 605 that is after the end date 635 of the new period actual 625 is found by using the following formula:

Completed work ×

$$\left[ \frac{\text{working time after end date of new period actual}}{\text{working time of entire actual work record}} \right]$$

which is equal to [25 hours * (8 hours/40 hours)], or 5 hours in this example.

At decision step 450, it is determined that there was completed work found at step 440 that was before the start date 630 of the new period actual 625 and the method proceeds to step 455. The end date 635 and completed work 620 of the actual work record 605 are modified at step 455. The end date 620 of the actual work record is modified to be day before the start date 630 of the new period, or (April 1). The completed work 620 is preferably modified to be equal to the amount of completed work in the actual work record 605 that is before the start date of the new period actual 625, as found at step 440. After the end date and completed work of the actual work record are modified at step 455, the method proceeds to decision step 460.

At decision step 460, it is determined that there was completed work found at step 445 that was after the end date 635 of the new period actual 625 and the method proceeds to step 465. A new actual work record 645 (FIG. 6B) is created at step 465. The new actual work record 645 has a completed work value equal to the amount of completed work that was found after the end date of the new period actual at step 445 (5 hours). The new actual work record also preferably has a start date equal to the day after the end date of the new period actual, or (April 5). The new actual work record also preferably has an end date equal to the end date of the actual work record found at step 425. After the new actual work record is created at step 465, the method proceeds to step 470.

At step 470, any actual work records contained within the period of the new period actual 625 are found, i.e., actual work records contained within the start date 630 and end date 635 of the new period actual. At step 475, all actual work records contained within the new period actual, i.e., all records found at step 470, are deleted. In this example, no actual work records are found at step 470, so no actual work records are deleted at step 475. The method 400 then proceeds to step 480.

At step 480, an actual work record which has a start date less than or equal to the end date 635 of the new period actual and which has an end date greater than the end date 635 of the new period actual is not found. The method then proceeds to decision step 482 where it is determined that no actual work record was found at step 480 and the method proceeds to step 497.

Figure 6B:
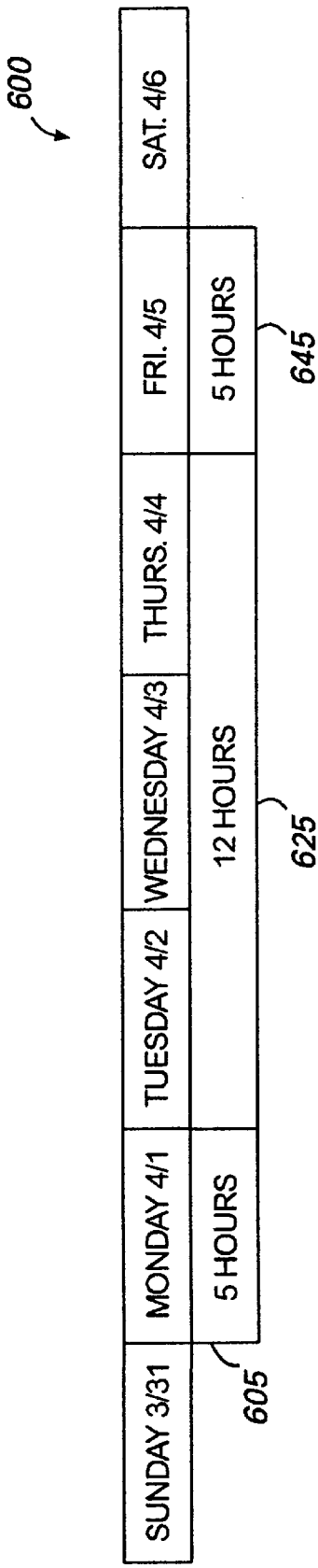

At step 497, the new period actual 625 is added to the sequence of actual work records. The method then ends at step 499. FIG. 6B shows the sequence of actual work records after the new period actual 625 has been stored and added to the sequence of actual work records. Actual work record 605 has been modified and actual work record 645 has been added.

From the foregoing description, it will be apparent to those skilled in the art that the present invention provides a method and system for editing actual work records. A period actual is entered. The actual work records that overlap the period actual are dynamically reshaped to eliminate any overlap. It should also be apparent to those skilled in the art that the present invention allows a user to view and enter a period actual at any granularity. In other words, actual work records do not have to be edited at the granularity of entry.

It should also be noted that although the preferred embodiment of the present invention distributes work uniformly, or evenly, over working time when actual work is viewed at different granularities, a non-uniform distribution method could be utilized. For example, a front-loading or scaling distribution method could be used.

Although the present invention has been described above as implemented in the preferred management program, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. For a management system for creating and editing a sequence of a plurality of actual work records, each of the actual work records comprising a start date, an end date, and a work amount, a method for adding a new period actual to the sequence of actual work records, wherein the new period actual comprises a period actual start date, a period actual end date, and a period actual work amount, the method comprising the steps of:

(a) receiving the period actual start date and the period actual end date for the new period actual;

(b) receiving the period actual work amount for the new period actual;

(c) determining whether any of the actual work records overlap the new period actual;

(d) if so, eliminating any overlap between the overlapping actual work records and the new period actual by:
   determining the ratio of non-overlapping working time of the overlapping actual work record to the total working time for the overlapping actual work record;
   multiplying the ratio by a work value of the overlapping actual work record to obtain a new work value for the overlapping actual work record;
   replacing the work value of the overlapping actual work record with the new work value;
   if the period actual start date was overlapped, editing an end date of the overlapping actual work record to be equal to the day before the period actual start date; and
   if the period actual end date was overlapped, editing a start date of the overlapping actual work record to be equal to the day after the period actual start date; and (e) adding the new period actual to the sequence of actual work records.

2. The method recited in claim 1, wherein the step of adding the new period actual comprises storing the new period actual as one of the actual work records.

3. The method recited in claim 1, wherein the step of determining whether any of the actual work records overlap the new period actual comprises determining whether the start date of one of the plurality of actual work records is between the period actual start date and the period actual end date.

4. The method recited in claim 1, wherein the step of determining whether any of the actual work records overlap the new period actual comprises determining whether the end date of one of the plurality of actual work records is between the period actual start date and the period actual end date.

5. A method for editing a sequence of a plurality of actual work records, each of the actual work records comprising a start date, an end date, and a work value, comprising the steps of:

receiving a period actual start date and a period actual end date corresponding to a period actual;

receiving a period actual work value corresponding to the period actual;

determining whether there is overlap between one of the actual work records and the period actual; and if there is overlap, then eliminating the overlap by:
determining the ratio of non-overlapping working time of the overlapping actual work record to the total working time for the overlapping actual work record;
multiplying the ratio by a work value of the overlapping actual work record to obtain a new work value for the overlapping actual work record;
replacing the work value of the overlapping actual work record with the new work value;
if the period actual start date was overlapped, editing an end date of the overlapping actual work record to be equal to the day before the period actual start date; and
if the period actual end date was overlapped, editing a start date of the overlapping actual work record to be equal to the day after the period actual start date.

6. The method recited in claim 5, further comprising the step of adding the period actual to the sequence of a plurality of actual work records.

7. The method recited in claim 5, wherein the plurality of actual work records are stored in the sequence sequentially by the start date and the end date of each of the actual work records.

8. The method recited in claim 5, wherein the step of determining whether there is overlap comprises the steps of:
locating a first actual work record in the sequence of the plurality of actual work records, wherein the first actual work record comprises a first start date, a first end date, and a first work value, wherein the first end date is at least the period actual start date; and
if a first actual work record is not located, then adding the period actual to the sequence of a plurality of actual work records.

9. The method recited in claim 8, wherein the step of eliminating the overlap comprises the steps of:
if the first actual work record is located, then determining whether the first start date is less than the period actual start date;
if the first start date is less than the period actual start date, then:
determining an amount of the first work value that is before the period actual start date;
determining an amount of the first work value that is after the period actual end date;
if the amount of the first work value that is before the period actual start date is zero, then deleting the first actual work record;
if the amount of the first work value before the period actual start date is greater than zero, then modifying the first end date and first work value;
if the amount of the first work value after the period actual end date is greater than zero, then creating a new actual work record;
deleting all of the actual work records contained within the period actual start date and period actual end date;
locating a second actual work record in the sequence of the plurality of actual work records, wherein the second actual work record comprises a second start date, a second end date, and a second work value, wherein the period actual end date is at least the second start date and wherein the second end date is greater than the period actual end date;
if the second actual work record is located, then:
determining an amount of the second work value that is after the period actual end date;
if the amount of the second work value that is after the period actual end date is zero, then deleting the second actual work record;
if the amount of the second work value after the period actual end date is greater than zero, then modifying the second start date and second work value; and
adding the period actual to the sequence of actual work records.

10. The method recited in claim 9, wherein the step of determining an amount of the first work value that is before the period actual start date comprises the steps of:
determining an amount of working time of the first actual work record that is before the period actual start date;
determining an amount of working time for the first actual work record; and
dividing the amount of working time of the first actual work record that is before the period actual start date by the amount of working time for the first actual work record to produce a division result, and multiplying the division result by the first work value to determine the amount of the first work value that is before the period actual start date.

11. The method recited in claim 9, wherein the step of determining an amount of the first work value that is after the period actual end date comprises the steps of:
determining an amount of working time of the first actual work record that is after the period actual end date;
determining an amount of working time for the first actual work record; and
dividing the amount of working time of the first actual work record that is after the period actual end date by the amount of working time for the first actual work record to produce a division result, and multiplying the division result by the first work value to determine the amount of the first work value that is after the period actual end date.

12. The method recited in claim 9, wherein the step of modifying the first end date and first work value comprises the steps of:
modifying the first end date to be equal to the date before the period actual start date; and
modifying the first work amount to be equal to the amount of the first work value before the period actual start date.

13. The method recited in claim 9, wherein the new actual work record comprises a new start date, a new end date, and a new work value, wherein the step of creating a new actual work record comprises the steps of:
setting the new start date equal to the day after the period actual end date;
setting the new end date equal to the first end date; and
setting the new work value equal to the amount of the first work value that is after the period actual end date.

14. The method recited in claim 9, wherein the step of deleting all of the actual work records contained within the period actual start date and period actual end date comprises the step of:
deleting all actual work records with a start date at least equal to the period actual start date and with an end date at most equal to the period actual end date.

15. The method recited in claim 14, wherein the step of modifying the second start date and second work value comprises the steps of:
   modifying the second start date to be equal to the date after the period actual end date; and
   modifying the second work amount to be equal to the amount of the second work value after the period actual end date.

16. The method recited in claim 9, wherein the steps of determining an amount of the first work value that is before the period actual start date, determining an amount of the first work value that is after the period actual end date, and determining an amount of the second work value that is after the period actual end date are performed in a non-uniform fashion.

17. A computer-readable medium having computer-executable instructions for performing the steps recited in claim 9.

18. A computer system for editing a plurality of actual work records, comprising;
   a processor; and
   a memory storage device for storing a program module;
   the processor, responsive to instructions from said program module, being operative to:
      receive a granularity;
      receive a cell selection;
      determine a period actual start date and a period actual end date of a period actual based on the cell selection and granularity;
      receive a period actual work value for the period actual;
      determine whether at least one of the plurality of actual work records overlaps the period actual start date or end date;
      edit the overlapping actual work record to eliminate overlap by:
         determining the ratio of non-overlapping working time of the overlapping actual work record to the total working time for the overlapping actual work record;
         multiplying the ratio buy a work value of the overlapping actual work record to obtain a new work value for the overlapping actual work record;
         replacing the work value of the overlapping actual work record with the new work value; and
         if the period actual start date was overlapped, editing an end date of the overlapping actual work record to be equal to the day before the period actual start date; and
         if the period actual end date was overlapped, editing a start date of the overlapping actual work record to be equal to the day after the period actual start date; and
      add the period actual to the plurality of actual work records.

* * * * *